United States Patent [19]

von Bose

[11] 4,365,321

[45] Dec. 21, 1982

[54] SONIC LOGGING TOOL

[75] Inventor: Robert J. von Bose, Arlington, Tex.

[73] Assignee: WPC, Inc., Midland, Tex.

[21] Appl. No.: 165,553

[22] Filed: Jul. 3, 1980

[51] Int. Cl.³ ............................................. G01V 1/40
[52] U.S. Cl. .................................... 367/25; 367/911; 181/102; 175/40; 340/854
[58] Field of Search ................. 367/25, 911; 181/102; 175/40, 45; 340/854

[56] References Cited

U.S. PATENT DOCUMENTS

| | | | |
|---|---|---|---|
| 2,156,052 | 4/1939 | Cooper | 367/25 |
| 2,350,371 | 6/1944 | Smith | 367/25 |
| 3,288,245 | 11/1966 | Anderson | 181/102 |
| 4,020,452 | 4/1977 | Trouillen et al. | 367/25 |
| 4,066,995 | 1/1978 | Matthews | 175/56 |

FOREIGN PATENT DOCUMENTS

| | | | |
|---|---|---|---|
| 672226 | 10/1963 | Canada | 367/911 |
| 693222 | 8/1964 | Canada | 367/25 |
| 752296 | 7/1956 | United Kingdom | 367/25 |
| 303422 | 7/1971 | U.S.S.R. | 181/102 |
| 481868 | 12/1975 | U.S.S.R. | 367/25 |
| 716013 | 2/1980 | U.S.S.R. | 367/25 |

*Primary Examiner*—Nelson Moskowitz
*Attorney, Agent, or Firm*—E. Harrison Gilbert, III

[57] ABSTRACT

A sonic logging tool which includes a relatively short sonic wave isolation section and further includes a structural member surrounding a pressure wave generating apparatus for creating a damping shorted turns effect is disclosed. The isolation section includes interlocking ends having serpentine edges which are spaced from each other, but which are interlocked for preventing longitudinal separation of the two ends. The isolation section also includes a damping material disposed between the spatially separated serpentine edges. The structural portion permits an electrical current to pass therethrough around the pressure wave generator apparatus.

4 Claims, 5 Drawing Figures

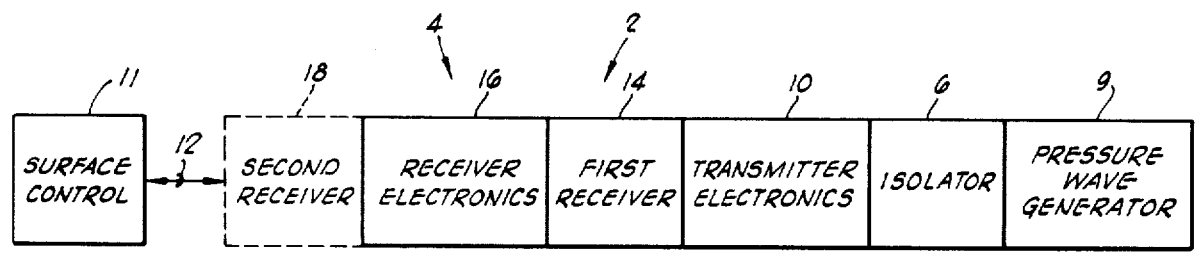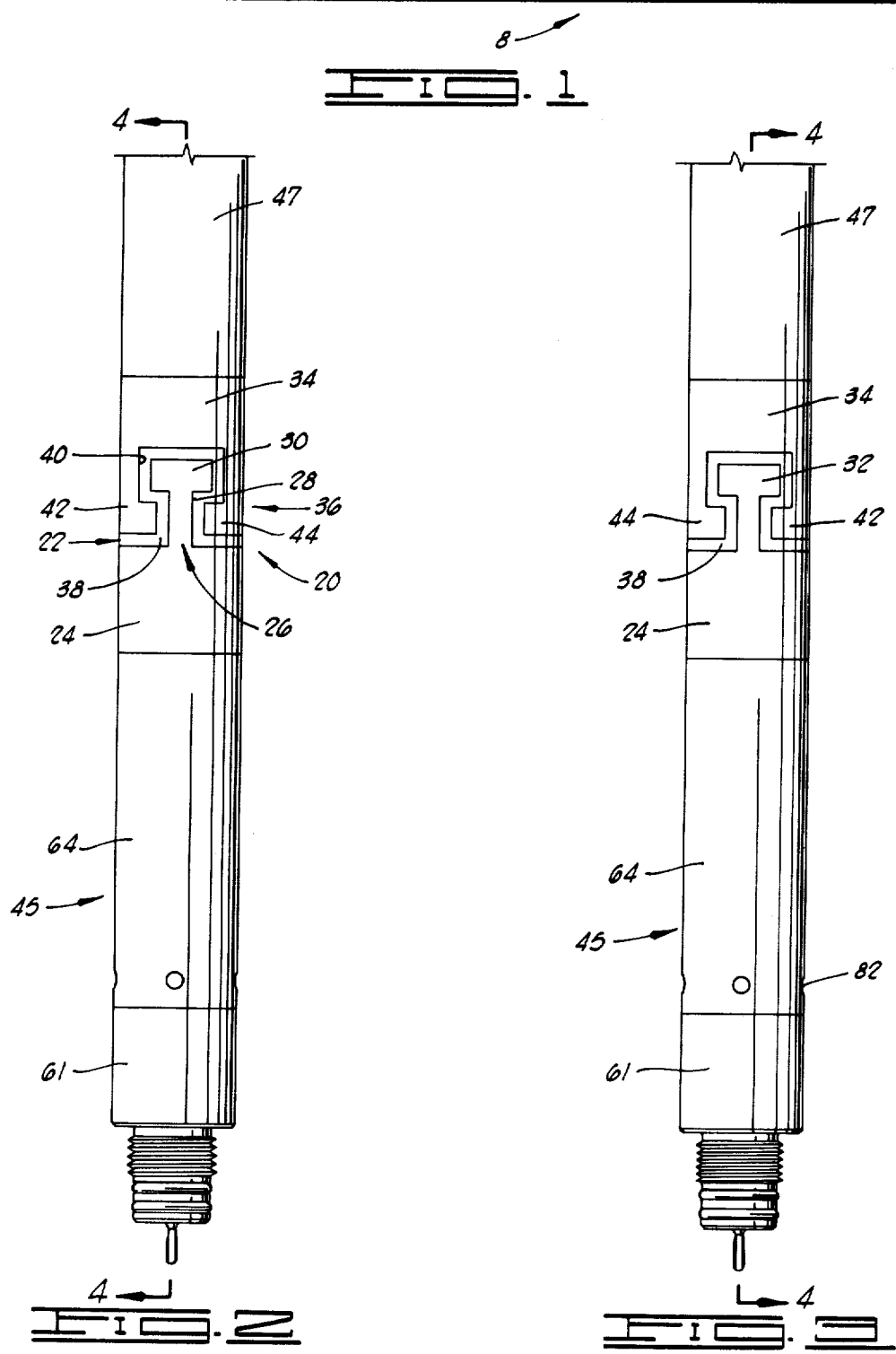

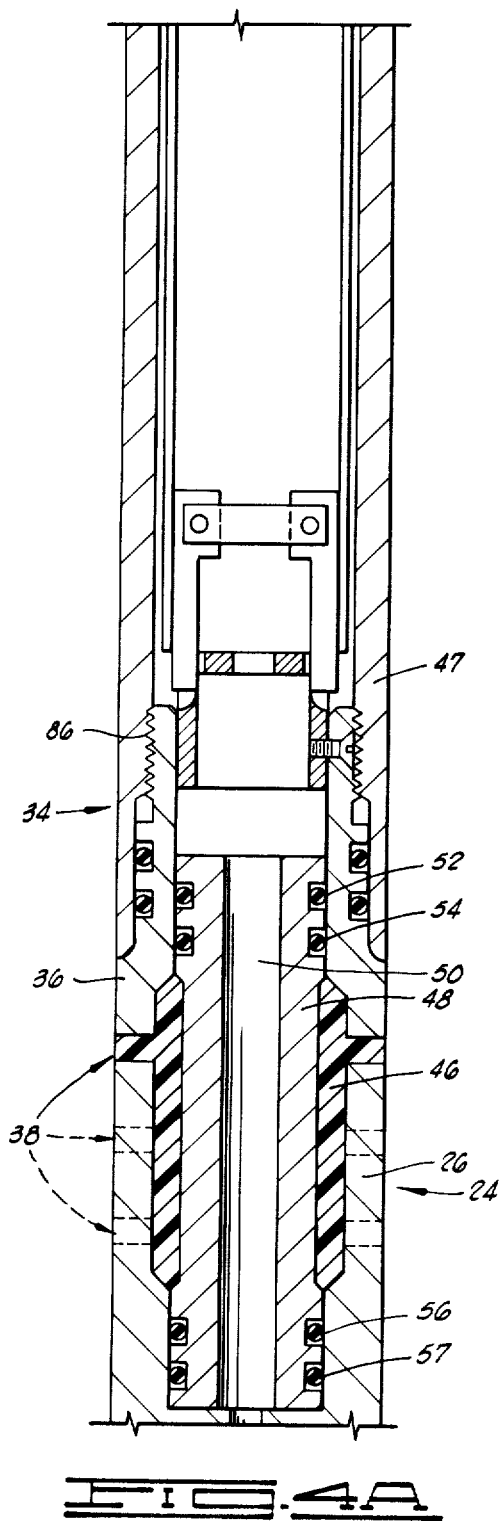
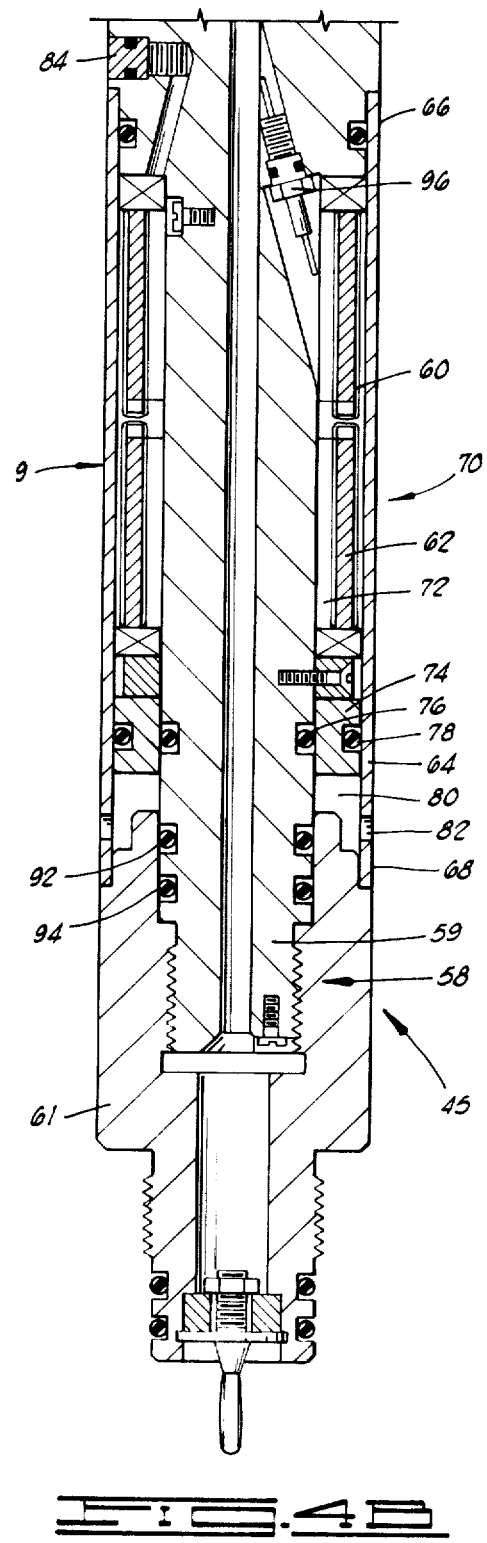
FIG. 4A
FIG. 4B

SONIC LOGGING TOOL

BACKGROUND OF THE INVENTION

1. Field of the Invention

This invention relates generally to apparatus for logging downhole conditions in a well and more particularly, but not by way of limitation, to sonic logging tools which emit sonic pressure waves and receive reflections or refractions thereof from downhole features in the well for determining the nature of such features.

2. Description of the Prior Art

In the oil and gas industry one manner in which reservoir management and well maintenance are performed is to conduct sonic logging tests wherein sonic waves are emitted by a transmitter located within a tool positioned in the well and then received by a receiver located within the tool after the waves have been reflected or refracted by the downhole features of the well. The received sonic waves are converted into an understandable log so that information about the downhole structure can be learned. For example, such a log can be used to disclose the nature of the bond which exists between the casing and the bored surface of the well. To perform this sonic logging, a sonic logging tool having a transmitter for generating and transmitting the sonic waves and a receiver for receiving the reflected or refracted waves is needed.

Because of the extreme conditions (such as high pressures and temperatures) which may be encountered at downhole locations, the sonic logging tool needs to be rugged to withstand these conditions. Additionally, because the diameter of a well or the tubing positioned therein can vary, the sonic logging tool needs to be compact so that it can be used in both small and large diameter structures. Additionally, a ruggedly and compactly constructed logging tool is desirable because it can be more economically constructed and maintained.

Because both the transmitter and receiver are contained within the tool, it is also necessary that the tool include means for isolating these two components so that the sonic waves emitted by the transmitter do not travel in substantially detectable quantities through the tool structure to the receiver. It is desirable to provide an effective sonic isolation means over a relatively short length of the tool because the shorter the isolator, the more manageable, and likely more inexpensive, is the tool. Although it is desirable for the isolation portion of the tool to be relatively short, this portion must maintain effective mechanical coupling between the transmitter and receiver portions of the tool so that the lower of these portions will not separate from the upper portion and drop into the well thereby necessitating costly fishing trips into the hole to retrieve the separated portion.

To generate and transmit the sonic waves, it is further desirable for the tool to include an electromagnetically responsive element which changes diameter in response to an appropriate current flowing through an electrical winding or coil wrapped around the electromagnetically responsive element. Because such a wave generating means has the shortcoming of "ringing", or producing secondary waves which interfere with the primary wave created by the initial current, it is necessary for the tool to include means for providing a damping shorted turn effect whereby the "ringing" of the electromagnetically responsive element and winding are attenuated. However, this ringing attenuating means should not weaken or add bulk to the tool because it is desirable for the tool to be made rugged and compact as previously described.

One type of sonic logging tool known in the art includes a transmitter having a band disposed around a portion of the tool structure and within an energizing coil. Wrapped around the energizing coil is a shorting coil which provides a path for conducting a protective current by which the damping shorted turn effect is created. This shorting coil causes this type of tool to be relatively bulky and to also be susceptible to failure because of the intrinsic weakness of a coil of wire. Therefore, such a tool does not meet the needs of compactness and ruggedness.

Sonic logging tools known in the art also include isolator joints; however, these joints are made of lead or flexible strips, for example, and physically separate the transmitter and receiver by a relatively long distance, such as three feet. Therefore, one of these relatively long tools is likely costlier than a shorter tool because of the additional material and are less manageable than a shorter tool because of the extra length and weight or flexibility of the isolator joint. Therefore, these types of tools do not provide relatively short sonic isolator joints which maintain an effective mechanical coupling between the transmitter and receiver portions of the sonic logging tool.

SUMMARY OF THE INVENTION

The present invention overcomes the above-noted and other shortcomings of the prior art by providing a novel and improved sonic logging tool. The present invention is compactly and ruggedly constructed and yet includes means for providing the damping shorted turn effect. These features of compactness and ruggedness provide the present invention with the capability of being used in wells and tubing structures having various diameters. These features further provide a tool which is relatively economical to construct and maintain.

The present invention further includes an isolation joint which provides effective isolation between the transmitter and receiver portions of the tool over a relatively short mechanical length by removing metal-to-metal contact between these portions. Although there is no metal-to-metal contact between these portions, they are interlocked so that they cannot become longitudinally disconnected from each other. The isolation joint is also effected by utilizing a damping means disposed between the interlocked portions of the tool. This damping means prevents the metal-to-metal contact and provides multiple reflective surfaces for damping the pressure waves as they attempt to travel longitudinally from the transmitter portion of the tool to the receiver portion of the tool. This relatively short isolation joint gives the present invention the advantages of being relatively cheaper because, for example, of the savings in material and of being relatively more manageable than the tools having longer, heavier and more flexible isolation joints.

Broadly, the present invention provides a logging tool comprising transmitter means for generating and transmitting pressure waves, receiver means for receiving a portion of the transmitted pressure waves, connecting means for mechanically connecting the transmitter means with the receiver means, and damping means for damping the transmitted pressure waves attempting to pass from the transmitter means to the receiver means through the connecting means.

The connecting means includes a first coupling section having the transmitter means associated therewith and having a first interlocking end. The connecting means also includes a second coupling section having the receiver means associated therewith and having a second interlocking end coupled in spaced relation with the first interlocking end of the first coupling section for preventing longitudinal separation of the first coupling section from the second housing section. Defined between the coupled first and second interlocking ends is a channel. The first interlocking end has a first serpentine edge and the second interlocking end has a second serpentine edge.

The connecting means also includes a housing having structural means for providing a protective current conducting path around the portion of the transmitter means which includes an electrical current conducting coil and an electromagnetically responsive member disposed within the housing.

The damping means is disposed within the channel defined between the first and second interlocking ends so that the first and second interlocking ends are maintained in spaced relation. In a preferred embodiment wherein the pressure waves are sonic waves, the damping means includes an elastomeric member for acoustically insulating the second coupling section from the first coupling section. This damping means and the coupling sections provide the present invention with a relatively short isolation joint which prevents separation of the portion of the tool containing the transmitter from the portion of the tool containing the receiver and which damps pressure waves attempting to pass through the tool from the transmitter portion to the receiver portion.

Therefore, from the foregoing it is a general object of the present invention to provide a novel and improved logging tool and in particular a sonic logging tool. Other and further objects, features, and advantages of the present invention will be readily apparent to those skilled in the art when the following description of the preferred embodiment is read in conjunction with the accompanying drawings.

BRIEF DESCRIPTION OF DRAWINGS

FIG. 1 is a block diagram of the preferred embodiment of the present invention.

FIG. 2 is an elevation view of the preferred embodiment of the present invention.

FIG. 3 is an elevation view of the preferred embodiment of the present invention taken opposite the FIG. 2 view.

FIGS. 4A-4B are a sectional view of the preferred embodiment of the present invention taken along the line 4—4 shown in FIGS. 2 and 3.

DETAILED DESCRIPTION OF THE PREFERRED EMBODIMENT OF THE INVENTION

With reference to the drawings a preferred embodiment of a logging tool 2 constructed in accordance with the present invention will be described. FIG. 1 illustrates that the tool 2 includes receiver means 4, isolator means 6, and transmitter means 8 comprising pressure wave generating means 9 and transmitter electronic circuit means 10. To control the logging tool 2, surface control means 11 is provided for communicating with the receiver means 4 and transmitter means 6 via suitable transmission means represented by arrow 12.

In the preferred embodiment receiver means 4 includes a first receiver device 14 and a receiver electronic circuit 16. The first receiver means 14 includes suitable wave detector means as is known in the art. For example, the first receiver device 14 can include a transducer for converting pressure waves into proportional electrical signals for processing by the receiver electronic circuit 16 and for transmission via transmission means 12 to the surface control means 11. The receiver electronic circuit 16 is of the type as is also known in the art. FIG. 1 also indicates that the receiver means 4 may include a second receiver device 18. In a preferred embodiment the second receiver means 18 is spaced aapproximately two feet from the first receiver means and is used with the first receiver device 14 as is known in the art to provide absolute values of the differences between pressure waves detected by each of the receiver devices 14 and 18.

The preferred embodiment of the isolator means 6 of the present invention is disclosed in FIGS. 2–4B. The isolator means 6 includes connecting means 20 for mechanically connecting at least a portion of the transmitter means 8 with the receiver means 4. For the embodiment shown in FIG. 1 the connecting means 20 particularly connects the pressure wave generating means 9 with the receiver means 4. The isolator means 6 further includes damping means 22 for damping the transmitted pressure waves attempting to pass from the transmitter means 8 (more particularly, from the pressure wave generating means 9 for the preferred embodiment) to the receiver means 4 through the connecting means 20.

The connecting means 20 is shown in FIGS. 2 and 3 to include a first coupling section 24 having at least a portion of the transmitter means 8 associated therewith. Although FIGS. 1 and 4B indicate that the pressure wave generating means 9 is the portion of the transmitter means 8 which is associated with the first coupling section 24, other portions of the transmitter means 8 can also be associated with the first coupling section 24. The first coupling section 24 includes a first interlocking end 26 having a first serpentine edge 28. In the preferred embodiment shown in the drawings the interlocking end 26 more particularly includes a first T-shaped protuberance 30 extending longitudinally from the first coupling section 24 and also includes a second T-shaped protuberance 32 extending longitudinally from the first coupling section 24. The second protuberance 32 is spaced from the first T-shaped protuberance 28 so that a first T-shaped opening and a second T-shaped opening are defined between the first and second T-shaped protuberances 30 and 32.

The connecting means 20 also includes a second coupling section 34 having the receiver means 4 (as well as the transmitter electronic circuit means 10 for the preferred embodiment) associated therewith and having a second interlocking end 36 coupled in spaced relation with the first interlocking end 26 of the first coupling section 24. The two interlocking ends 26 and 36 are coupled so that longitudinal separation of the first coupling section 24 from the second coupling section 34 is prevented. Defined between the coupled first and second interlocking ends 26 and 36 is a channel 38.

The second interlocking end 36 has a second serpentine edge 40 which has a configuration identical to the configuration of the first serpentine edge 28 for the preferred embodiment shown in the drawings. More particularly, the second interlocking end 36 includes a third T-shaped protuberance 42 extending longitudinally from the second coupling section 34 and into the first T-shaped opening defined between the first and second T-shaped protuberances 30 and 32. The second interlocking end 36 further includes a fourth T-shaped protuberance 44 extending longitudinally from the second coupling section 34 and into the second T-shaped opening defined between the first and second T-shaped protuberances 30 and 32. As will be noted, the third and fourth T-shaped protuberances 42 and 44 define third and fourth T-shaped openings in which the first and second T-shaped protuberances 30 and 32 are disposed.

FIGS. 2 and 3 illustrate that the interlocking ends 26 and 36 are coupled so that the coupling sections 24 and 34 cannot become disconnected by means of only a longitudinal force. This coupling is effected by means of the overlapping cross members of the respective T-shaped protuberances. For example, FIG. 2 shows that the cross member of the protuberance 30 overlaps the cross members of the protuberances 42 and 44 so that longitudinal separation of the first coupling section 24 from the second coupling section 34 is prohibited.

Although T-shaped protuberances of the interlocking ends 26 and 36 are illustrated for the preferred embodiment shown in FIGS. 2-4, it is to be understood that any suitable interlocking serpentine configuration can be used.

Associated with the first coupling section 24 and the second coupling section 34 are a first housing section 45 and a second housing section 47, respectively. The respective coupling sections and housing sections can be either integrally formed together, as are the first coupling section 24 and first housing section 45 shown in FIGS. 4A-4B, or detachably connected, as are the second coupling section 34 and the second housing section 47 shown in FIG. 4A. Each housing section and each coupling section is made of a suitable substance, such as stainless steel.

The damping means 22 is disposed within the channel 38 so that the first and second interlocking ends 26 and 36 are maintained in spaced relation. In FIG. 4A the damping means 22 is shown to include a sonic wave insulating member 46 which is disposed in the channel 38 and extends therefrom into the first and second coupling sections adjacent a sleeve 48. In the preferred embodiment the sonic wave insulating member 46 is an elastomeric member which attenuates sonic waves attempting to pass from the first coupling section 24 to the second coupling section 34. In particular, the waves attempting to pass through the coupling sections are the pressure waves generated by the pressure wave generating means 9 which travel longitudinally through the first housing section 45 and the first coupling section 24. The attenuating or damping of the longitudinally traveling pressure waves is achieved because the insulating member 46 prevents metal-to-metal contact between the first coupling section 24 and the second coupling section 34 and also because the insulating member 46 provides multiple reflective surfaces as a result of the differences in the acoustic impedances at the coupling-insulating member interfaces. Although the preferred embodiment of the damping means includes a suitable elastomeric member for attenuating pressure waves having frequencies within the sonic spectrum, the damping means can include a member made of any suitable substance capable of damping, or attenuating, pressure waves having a frequency or frequencies within a predetermined frequency range, or spectrum.

The sleeve 48 is made of a suitable material, such as stainless steel, and is slidably positioned within the first coupling section 24 and the second coupling section 34. The sleeve 48 includes an opening 50 extending longitudinally therethrough for permitting electrical conductors to extend from the second coupling section 34 to the first coupling section 24 for connection to the transmitter means (particularly, the pressure wave generating means) located in the first housing section 45. The electrical conductors may, for example, extend from the surface control means 11 to provide the transmission means 12 by which signals are transferred between the surface control means 11 and the logging tool 2. To effect fluid tight seals between the sleeve 48 and the respective coupling sections 24 and 34, O-rings 52, 54, 56 and 57 are disposed around the sleeve 48 as shown in FIG. 4A.

The transmitter means 8 is disclosed in FIG. 1 to include the pressure wave generating means 9 and the transmitter electronic circuit means 10. The pressure wave generating means 9 includes means for electromagnetically generating and transmitting pressure waves. In the preferred embodiment the generated and transmitted pressure waves have appropriate frequencies whereby the waves are sonic waves. More particularly the wave generating means 9 includes electromechanical means for generating a sonic pressure wave by magnetostrictive response to the introduction of an appropriate electrical current to the electromechanical means.

The electromechanical means is disclosed in FIG. 4B to include an electrical current conducting winding or coil 60 and an electromagnetically responsive member 62 disposed within the winding 60. The member 62 is preferably a band of magnetostrictive material as is known in the art and shown in FIG. 4B. The combination of the coil 60 and the band 62 is disposed adjacent a casing member 64 for contraction therein in response to an appropriate actuating current flowing through the coil 60. The coil 60 and the band 62 are also disposed in spaced relation with a core member 58 having an upper portion 59 and a lower portion 61 threadedly connected to the upper portion as shown in FIG. 4B.

The transmitter electronic circuit means 10 is of the type known in the art for receiving a control signal from the surface control means 11 and in turn introducing an appropriate current into the coil 60 for properly actuating the movement of the band 62.

As is known in the art actuation of the band 62 causes a ringing effect whereby a useful primary pressure wave is generated by the magnetostrictive contraction of the band and a plurality of secondary pressure waves having lesser magnitudes than the primary pressure wave are generated as the band oscillates after the initial contraction caused by a single input of current. These secondary pressure waves are deleterious to the operation of the logging tool because they interfere with the primary pressure wave and thus distort the signals received by the receiver means 4.

To overcome the undesirable ringing effect of the band 62 which occurs in response to an actuating current, the present invention includes structural means for providing a current conducting path around the band 62 to create a damping shorted turn effect whereby the ringing of the band 62 is shortened after the initial current surge. This effect keeps the intelligible signals (i.e., the primary pressure waves) from being distorted or blocked. Although the damping shorted turn effect is known in the art as indicated by the use of shorting coils placed around the coil and band structure of prior art devices, the damping shorted turn effect has not heretofore been accomplished in a sonic logging tool by utilizing structural means.

The structural means of the present invention provides a path for passing around the band 62 a current induced thereby during the ringing of the band. For the preferred embodiment, shown in FIG. 4B, the structural means includes a portion of the core element 58 and an electrically conductive casing member 64. The casing member 64 is positioned adjacent the exterior of the band 62 and in electrical contact with the core element 58 so a current is induced in the structural current conducting path means during electromagnetic ringing of the band 62. As shown in FIG. 4B the casing member 64 has a first end portion 66 and a second end portion 68 disposed in electrical contact with respective portions of the core member 58 so the electric current can flow between the core member 58 and the casing member 64.

The casing member 64 further includes a central portion 70 extending between the end portions 66 and 68 is spaced relation to the core member 58 so that a cavity is defined for receiving the portion of the transmitter means 8 including the coil 60 and band 62. In the preferred embodiment the cavity is defined by an indentation which is formed in the core member 58 and by the casing 64 which is placed adjacent the core member 58 so that it overlies the indentation. The indentation shown in FIG. 4B is coextensive with the central portion 70 of the casing 64.

To acoustically couple the band 62 to the casing member 64 during its operation, coupling means, such as oil or other appropriate substances as are known in the art, is placed in a first chamber 72 of the cavity. The first chamber 72 of the cavity is defined by respective portions of the core element 58 and the casing member 64 and by a pressure responsive collar 74 which is slidably disposed in the cavity in fluid tight engagement with the core member 58 and the casing member 64. As shown in FIG. 4B this fluid tight engagement is effected by means of appropriately positioned O-rings 76 and 78. The pressure responsive collar 74 is also positioned within the cavity so that a second chamber 80 is defined therein.

The casing 64 has an aperture 82 formed therein for permitting fluid located externally of the housing to enter the second chamber 80 so that the collar 74 slidingly responds to a pressure differential which may exist between the coupling means disposed in the first chamber 72 and the fluid located in the second chamber 80. This pressure equalization feature is necessary because the varying downhole conditions such as pressure and temperature often cause destructive pressure differentials to exist between fluid contained within the logging tool and fluids located externally thereof.

To introduce the appropriate coupling means into the first chamber 72, the core member 58 includes an aperture having a fill plug 84 removably placed therein.

FIGS. 4A-4B further show that in the preferred embodiment the second coupling section 34 is removably attached to the housing section 47 by means of a threaded connecting means 86. FIG. 4B shows that the connection between the upper and lower portions of the core element 58 is made fluid tight by means of O-rings 92 and 94. FIG. 4B shows housing 45 further includes feed-through means 96 which is connected to the upper portion 59 of the core member 58 and through which an appropriate electrical conductor or conductors are fed from the transmitter electronic circuit means 10 to the coil 60.

With reference to all the drawings generally, the operation of the present invention will be described. Broadly, the apparatus of the present invention functions by generating and transmitting pressure waves and then receiving reflected or refracted ones of the pressure waves. For the embodiment of the present invention depicted in FIG. 1, the generation and transmission of the pressure waves is controlled by appropriate electrical signals from the surface control means 11. The received waves are transmitted to the surface control means 11 and converted into logs which are used to determine the nature of the structure which reflected or refracted the waves. For example, pressure waves (in particular sonic waves for the preferred embodiment shown in FIGS. 2-4B) can be transmitted in a well by the tool 2 and the received reflections and refractions logged and used to indicate the nature of the bond between a casing in the well and the bored surface of the well.

To generate and transmit the requisite pressure waves, an appropriate current is introduced into the coil 60 to electromagnetically cause the band 62 to rapidly contract and create a pressure wave which is transmitted through the coupling means in chamber 72 to the casing member 64 and then to the well bore fluid surrounding the tool in the well being logged. In the preferred embodiment the emitted pressure waves are sonic waves.

In accordance with the present invention the transmission of the pressure waves occurs with a reduced production of interfering secondary pressure waves because of the damping shorted turns effect created by the structural current conducting path of the housing section 45 which particularly includes the upper portion 59 and the lower portion 61 of the core member 58 and the casing member 64. In other words, when an appropriate current is introduced into the coil 60 whereby the band 62 contracts to create a primary sonic wave, a current which reduces the ringing of the coiled band unit is induced in the casing member/core element current conducting path. By having the current conducting path integrally formed in the structure, the tool constructed in accordance with the present invention is more compact and rugged than tools which utilize a second coil of wire to create the damping shorted turns effect.

The present invention further operates by damping the transmission of the pressure waves which travel through the housing 45 (particularly, the upper portion 59 of the core member 58) and coupling section 24. This damping prevents these pressure waves from passing in substantially detectable quantities to the receiver means 4 and thereby reduces interference with the received reflected or refracted pressure waves. This damping is achieved in the preferred embodiment of the present invention by mechanically interlocking, but spatially separating, the two housing sections and two coupling sections of the tool 2 and by placing an elastomeric member in the channel formed between the ends of the coupling sections. The elastomeric member is of a type having suitable acoustic characteristics for impeding pressure waves having frequencies within the predetermined range of frequencies generated and transmitted by the transmitter means. This mechanical interlocking of sections and utilization of an elastomeric or other suitable member provides the present invention with an effective isolation joint having a relative short length as compared to the longer, heavier and less manageable joints of previous tools using lead or flexible strip isolation joints. In the preferred embodiment shown in FIGS. 2-4A, the length of the interlocked ends and elastomeric member is approximately four inches as compared to three feet in prior devices.

Thus, the present invention of a sonic logging tool is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. A logging tool, comprising:
   pressure wave generating means for generating and transmitting pressure waves;
   receiver means for receiving a portion of the transmitted pressure waves;
   connecting means for mechanically connecting said pressure wave generating means with said receiver means, said connecting means including:
      a first coupling section having said pressure wave generating means associated therewith and having a first interlocking end, said first interlocking end including:
         a first T-shaped protuberance extending longitudinally from said first coupling section; and
         a second T-shaped protuberance extending longitudinally from said first coupling section and spaced from said first T-shaped protuberance so that a first T-shaped opening and a second T-shaped opening are defined between said first and second T-shaped protuberances; and
      a second coupling section having said receiver means associated therewith and having a second interlocking end coupled in spaced relation with the first interlocking end of said first coupling section for preventing longitudinal separation of said first coupling section from said second coupling section, said coupled first and second interlocking ends defining a channel therebetween, said second interlocking end including:
         a third T-shaped protuberance extending longitudinally from said second coupling section and into said first T-shaped opening; and
         a fourth T-shaped protuberance extending longitudinally from said second coupling section and into said second T-shaped opening; and
   damping means for damping the transmitted pressure waves attempting to pass from said pressure wave generating means to said receiver means through said connecting means, said damping means being disposed within the channel defined between the first and second interlocking ends so that said first and second interlocking ends are maintained in said spaced relation.

2. An apparatus as defined in claim 1, wherein said damping means includes an elastomeric member for acoustically insulating said second coupling section from said first coupling section.

3. A coupling apparatus for damping pressure waves traveling longitudinally along a jointed structure, comprising:
   a first coupling section including a first interlocking end having a serpentine edge, said first interlocking end including:
      a first T-shaped protuberance extending longitudinally from said first coupling section; and
      a second T-shaped protuberance extending longitudinally from said first coupling section and spaced from said first T-shaped protuberance so that a first T-shaped opening and a second T-shaped opening are defined between said first and second T-shaped protuberances;
   a second coupling section including a second interlocking end having a second serpentine edge, said second interlocking end being coupled in spaced relation with the first interlocking end of said first coupling section for preventing longitudinal separation thereof, said second interlocking end including:
      a third T-shaped protuberance extending longitudinally from said second coupling section into said first T-shaped opening; and
      a fourth T-shaped protuberance extending longitudinally from said second coupling section into said second T-shaped opening; and
   damping means, disposed between said first and second interlocking end, for damping pressure waves attempting to pass longitudinally along the jointed structure.

4. A coupling apparatus as defined in claim 3, wherein said damping means includes an elastomeric member for acoustically insulating said second coupling section from said first coupling section.

* * * * *